United States Patent [19]

Anderson

[11] Patent Number: 5,086,612
[45] Date of Patent: Feb. 11, 1992

[54] TAIL LENGTHENER ASSEMBLY AND METHOD OF USE

[76] Inventor: Heather E. Anderson, Lone Eagle Ranch, Rte. 5, Hutchinson, Kans. 67502

[21] Appl. No.: 654,286

[22] Filed: Feb. 11, 1991

[51] Int. Cl.$^5$ .............................................. B68B 7/00
[52] U.S. Cl. .......................................... 54/78; 119/83; 119/105
[58] Field of Search ............... 54/78; 119/83, 85, 105; 132/212, 200, 202

[56] References Cited

U.S. PATENT DOCUMENTS

| | | | |
|---|---|---|---|
| 31,285 | 7/1899 | McClellan | 54/78 |
| 148,367 | 3/1874 | Howard | 54/78 |
| 212,836 | 3/1879 | Briggle | 54/78 |
| 2,487,005 | 11/1949 | Walker | 54/78 |
| 3,347,018 | 10/1967 | Laidig | 54/78 |
| 4,972,660 | 11/1990 | Black | 54/78 |

*Primary Examiner*—John G. Weiss

[57] ABSTRACT

This invention is a tail lengthener assembly and method of use to be attached to and enclose a horse's tail. The tail lengthener assembly includes 1) a tail enclosure asembly; 2) a tail hook member for attachment of the tail enclosure assembly to the horse's tail; and 3) elastic band members for attachment purposes. The tail lengthener assembly includes a plurality of tail tube member, each of an elongated tubular shape and constructed of a flexible cloth material having a main tube body with a connector member at an upper end thereof. The respective tail tube members are to receive a portion of the horse's tail therethrough and secured to an upper portion thereof. The tail hook member is operable to grasp a portion of the horse's tail and pull the same through the respective tail tube members during the method of attaching thereto. The elastic band members are of a conventional circular shape for attachment purposes. The method of use provides steps for 1) receiving and attaching a tail tube member to respective qual portions of the horse's tail; 2) braiding the adjacent separate tail tube members together into a ponytail structure; and 3) attaching a lower portion of adjacent ones of the tail tube members together through use of the elastic band members.

19 Claims, 2 Drawing Sheets

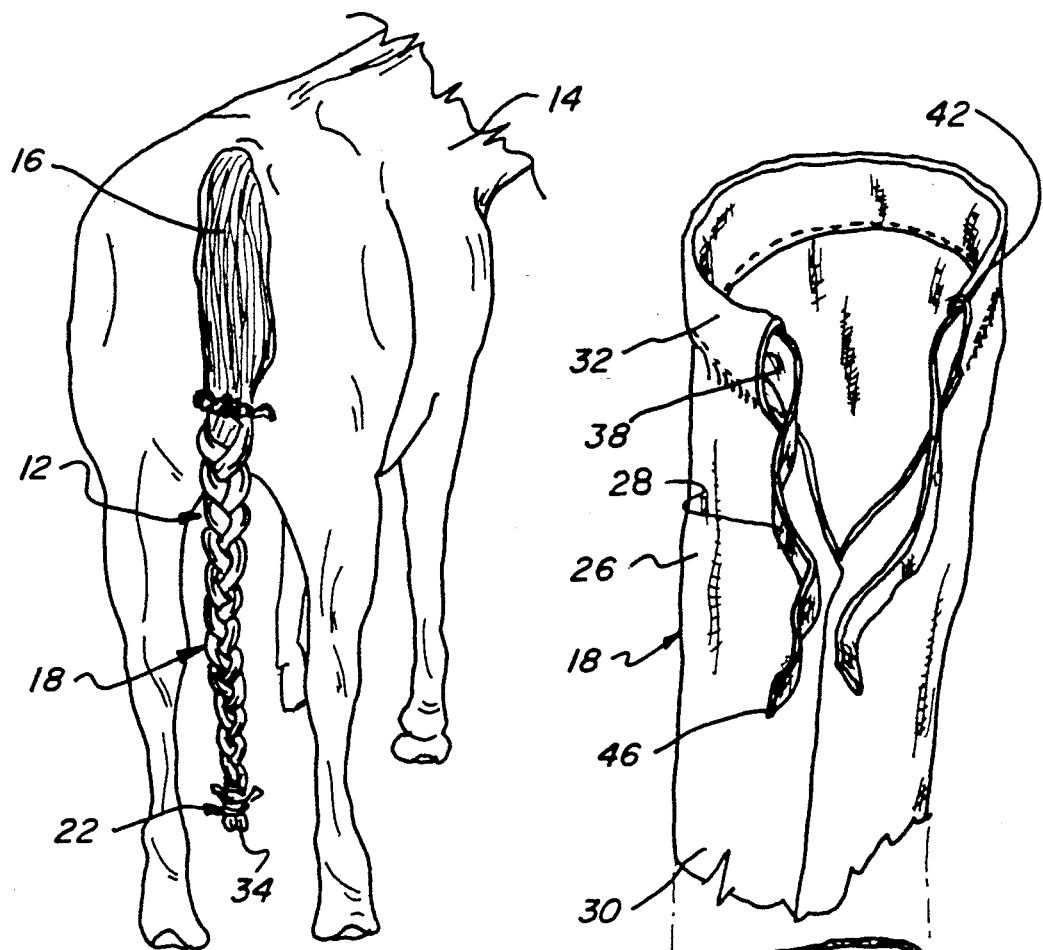
Fig_1
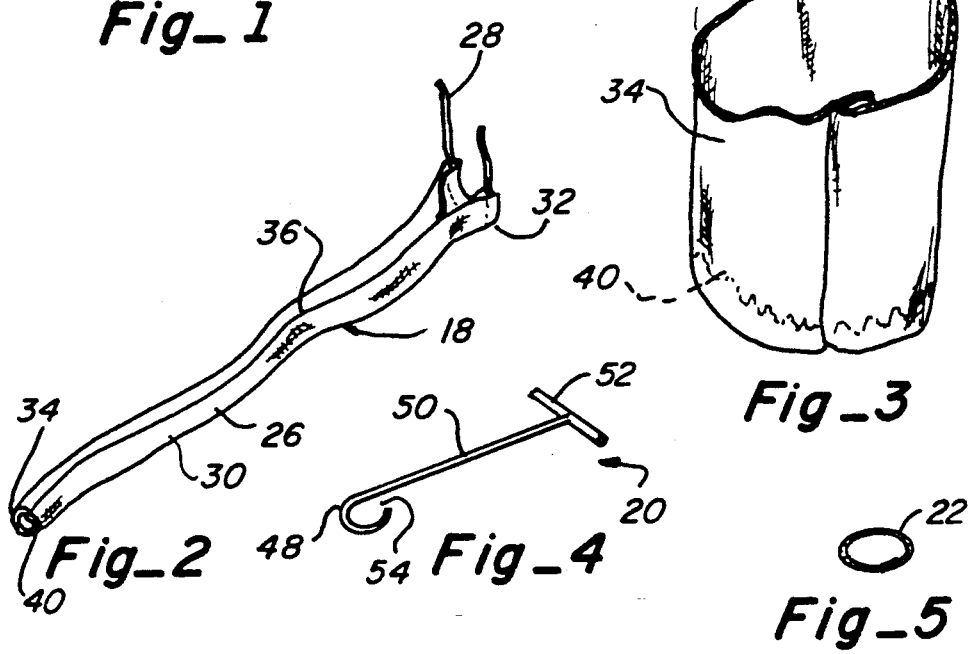
Fig_2  Fig_3
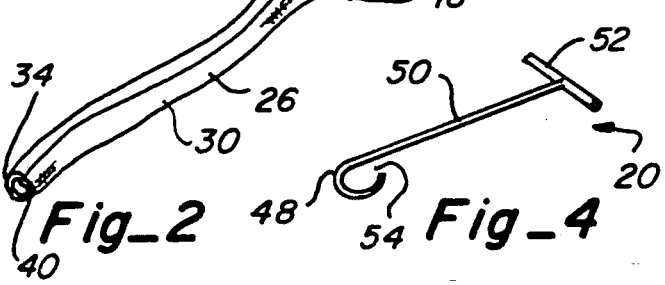
Fig_4  Fig_5

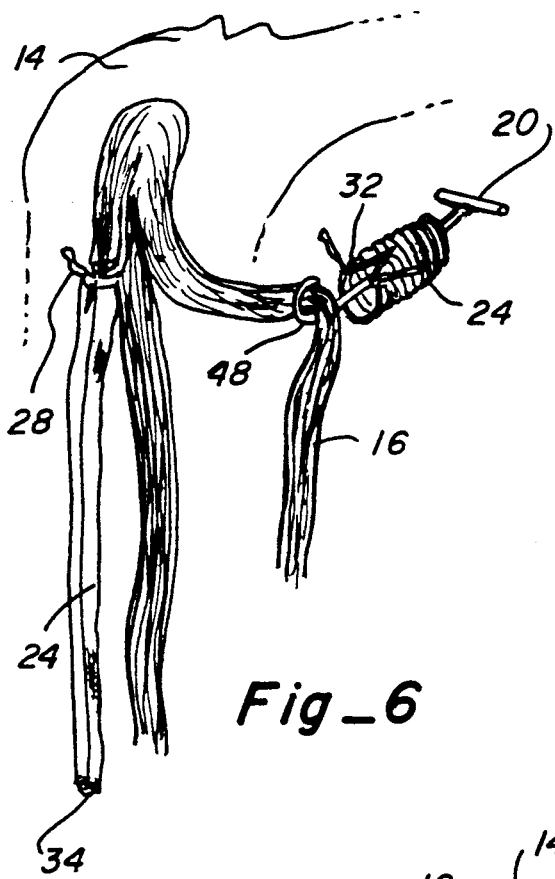
Fig_6
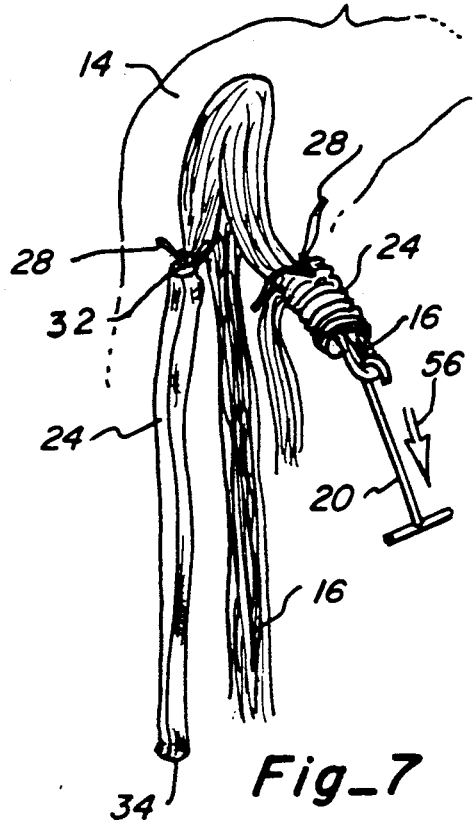
Fig_7
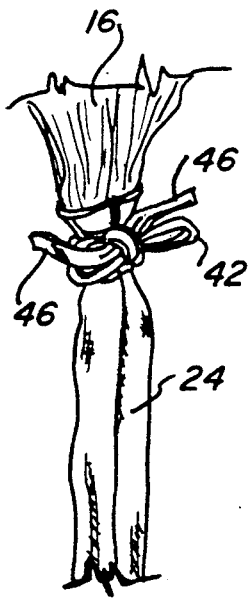
Fig_8
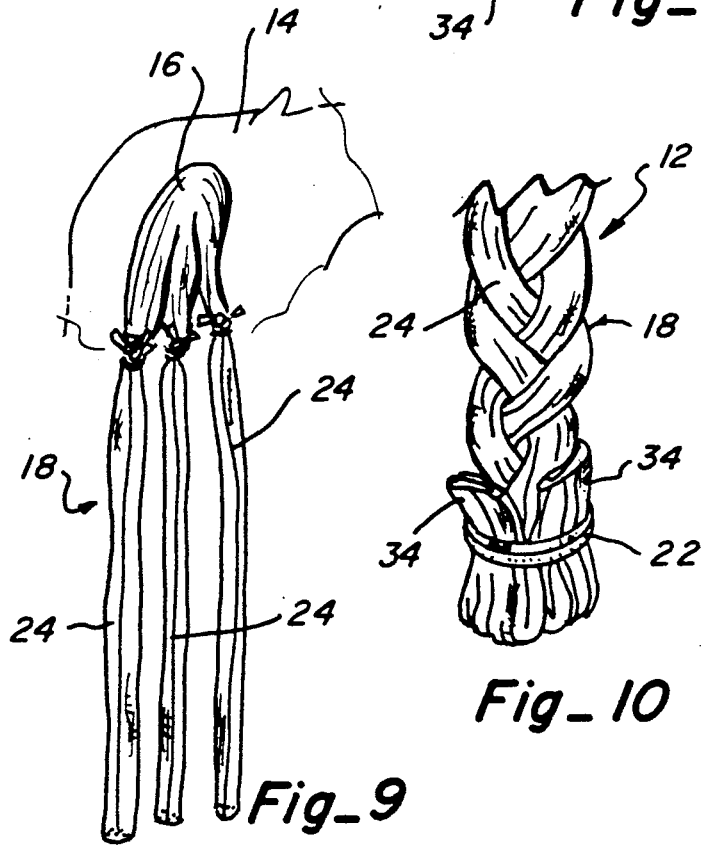
Fig_9
Fig_10

TAIL LENGTHENER ASSEMBLY AND METHOD OF USE

PRIOR ART

A patent search was not conducted on this invention.

PREFERRED EMBODIMENT OF THE INVENTION

In one preferred embodiment of this invention, a tail lengthener assembly and method of use is provided which is operable to be attached to an object such as a tail on a horse member for enclosing and protecting to aid in faster growth of the horse member's tail by adding weight thereto. The tail lengthener assembly includes 1) a tail enclosure assembly; 2) a tail hook member for use in the method of operation of the invention; and 3) elastic band members used in the overall assembly and method. The tail enclosure assembly includes a plurality, namely three, tail tube members, each to receive an equal portion of the horse's tail therein. Each tail tube member includes a main tube body having a connector member mounted on one end thereof. The main tube body includes 1) elongated cloth body section; 2) an upper connector section integral with one end of the cloth body section; and 3) a lower connector section integral with an opposite end of the cloth body section. The upper connector section is provided with a folded over loop portion to receive the connector member therein. The lower connector section is provided with an opening therein enclosed by a hem portion. The connector member includes a drawstring having end portions to be joined together.

The tail hook member includes a J-hook section integral with a main body section having an outer end thereof connected to a transversely extended handle section. The J-hook section is provided with an inlet slot portion for receiving a portion of the horse's tail and pulling through respective ones of the tail tube members. The handle section is perpendicular to the main body section operable to be grasped for pulling purposes in the method of use of the invention.

The elastic band members are of a conventional hair braid type which can be of any required diameter and utilized for grasping and securing portions of the tube enclosure assembly and the horse's tail.

In the method of use of the preferred embodiment of the tail lengthener assembly, the user thereof would normally take the primary steps of cleansing and brushing the horse's tail prior to use of this invention thereon. Additionally, the horse's tail may be treated with a conditioner or moisturizer before it is placed in an enclosed condition by the tail lengthener assembly of this invention.

The first process step is to insert the J-hook section of the tail hook member through an opening in the lower connector section of one of the tail tube members. Next, the entire main tube body is pulled onto the main body section of the tube hook member so as to expose the J-hook section.

Next, the horse's tail is divided into equal parts, such as three, and an upper portion of the separated part of the horse's tail is grasped by the inward slot portion of the tail hook member. The user then pulls the captured portion of the horse's tail, while holding the upper connector section of the main tube body stationary, downwardly to pull into the length of the main tube body. The connector member is used for securing the tail tube member to an upper portion of the horse's tail.

The above method process steps are then repeated to mount the other two tail tube members on the remaining respective one-third portions of the horse's tail. Next, the user proceeds to braid the horse's tail into a well known "ponytail" style used on horses and people alike.

On achieving the braiding of the horse's tail, the adjacent three lower connector sections can be folded upwardly and bound together with one or more of the elastic band members.

It is obvious that the aforementioned method steps would be repeated in reverse operation to remove the tail lengthener assembly from the horse's tail.

OBJECTS OF THE INVENTION

One object of this invention is to provide a tail lengthener assembly which can be readily attached to an animal's tail such as a horse's tail to provide protection from the elements; aid in tail growth; provide an enclosure to retain moisturizer or conditioners thereon; and allows the horse member to utilize it's wrapped tail for fly swatting purposes.

Another object of this invention is to provide a tail lengthener assembly to be attached to an animal's tail separated in equal portions such as thirds which can then be braided into a "ponytail" to provide an enclosed protection thereto while aiding in the tail growth and allowing the braided tail to be used for insect fly swatting purposes.

One other object of this invention is to provide a tail lengthener assembly which can be readily attached to a horse's tail in easy to follow method steps and provides an enclosure for the tail for holding conditioners, moisturizers, medication, and other such products and eliminates the need for daily tail grooming while concurrently aiding the horse's tail to grow to extended lengths.

One further object of this invention is to provide a tail lengthener assembly provided with tail tube members to enclosure separate equal portions of the horse's tail which can then be braided thus providing protection of the horse's tail against snagging, sun, and tangles.

Another further object of this invention is to provide a means of treating an animal's tail, such as a horse's tail, with method steps to 1) enclose separate but equal portions of the horse's tail; 2) braid the horse's tail into a "ponytail"; and 3) secure outer adjacent ends of the braided horse's tail to achieve an enclosed, compact braided horse's tail.

Still, one other object of this invention is to provide a tail lengthener assembly and method of use which is economical to manufacture; uses simple method steps for use thereof; may be constructed of various lengths and colors to achieve its desired purpose and function; constructed of material that is easily washable for continued use; and is substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is a fragmentary perspective view of a rear portion of a horse member with a horse's tail having a tail lengthener assembly of this invention mounted thereon;

FIG. 2 is a perspective view of one of tail tube members of the tail lengthener assembly of this invention;

FIG. 3 is a enlarged foreshortened perspective elevational view of the tail tube member illustrated in FIG. 2;

FIG. 4 is a perspective view of a tail hook member of the tail lengthener assembly of this invention;

FIG. 5 is a perspective view of an elastic band member of the tail lengthener assembly of this invention;

FIG. 6 is an elevational view of the horse's tail having one tail tube member of the tail lengthener assembly of this invention attached and a second tail tube member being connected thereto in a further step of the method of use of this invention;

FIG. 7 is a view similar to FIG. 6 illustrating an additional method step of this invention;

FIG. 8 is an elevational view illustrating a top portion of the horse's tail with a connecting method step to secure the respective tail tube member thereto;

FIG. 9 is a view similar to FIGS. 6 and 7 illustrating attachment of all of the tail tube members to the horse's tail utilizing the method of this invention; and FIG. 10 is a fragmentary elevational view of a lower portion of the horse's tail having the tail lengthener assembly of this invention secured thereto.

The following is a discussion and description of preferred specific embodiments of the tail lengthener assembly and method of use of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail, and in particular to FIGS. 1, a tail lengthener assembly of this invention, indicated generally at 12, is shown as utilized on an animal, namely a horse member 14, and, more specifically, on a horse's tail 16.

The tail lengthener assembly 12 includes 1) a tail enclosure assembly 18; 2) a tail hook member 20 (FIG. 4) utilized for mounting the tail enclosure assembly 18 on the horse's tail 16; and 3) an elastic band member 22 or plurality thereof used for securing purposes.

The tail enclosure assembly 18 includes a plurality, namely three, tail tube members 24 to be mounted on the horse's tail 16 as noted in FIG. 9. Each tail tube member 24 includes a main elongated main tube body 26 having a connector member 28 secured to an upper end thereof.

Each main tube body 26 includes 1) a central main cloth body section 30; 2) an upper connector section 32 integral with one end portion of the cloth body section 30; and 3) a lower connector section 34 integral with an opposite lower portion of the cloth body section 30. The cloth body section 30 is formed and held in a tubular shape through use of a sewn seam portion 36 extended the entire length thereof.

The upper connector section 32 is provided with an enclosed loop portion 38 to receive the connector member 28 extended therethrough as best noted in FIG. 3. The lower connector section 34 is folded inwardly and sewn into a conventional hem portion 40.

The connector member 28 is constructed of a flexible strong material being a drawstring 42 having outer end portions 46 which are to be joined together in a manner to be explained.

As noted in FIG. 4, the tail hook member 20 is provided with a J-hook section 48 integral with one end of a main body section 50 and an opposite other end is connected to a handle section 52. The J-hook section 48 is provided with an inlet slot portion 54 to be utilized in a manner to be described.

The handle section 52 is secured centrally to the main body section 50 and is extended perpendicular thereto for use in grasping and pulling a portion of the horse's tail 16 as will be explained in the method of use of this invention.

The elastic band members 22 are of a generally conventional nature and can be of various diameters.

USE AND OPERATION OF THE INVENTION

It is noted that the tail lengthener assembly 12 and method of use of this invention can be utilized by various persons such as a horse's owner, trainer, or maintenance person as it does not require special skills in the use thereof. We will refer to the one utilizing this invention as the "handler" in our further description thereof.

The handler of the horse member 14 would normally first desire to prepare the horse's tail 16 for attachment of the tail lengthener assembly 12 thereon through an initial step of cleansing the horse's tail 16 to free the same of dandruff or undesired foreign materials.

Next, the handler may wish to apply a conditioner or moisturizer such as mineral oil to the horse's tail 16 after brushing to achieve the desired condition thereof.

Once the horse's tail 16 is semi-dry and in the condition desired by the handler, the tail lengthener assembly 12 may be attached thereto.

The first step is to insert the tail hook member 20 through one of the tail tube members 24 so that the J-hook section 48 is extended through an outer end thereof as shown in FIG. 6. Next, the handler would then take the J-hook section 48 and grasp a portion, such as one-third, of the horse's tail 16 and place over and against the main body section 50 with the one-third portion of the horse's tail 16 mounted within the J-hook section 48 as noted in FIG. 6.

Then, the handler would grasp a portion of the horse's tail 16, such as one-third thereof, when utilizing three of the tail tube members 24 of this invention.

Next, the handler would grasp the handle section 52 to pull the J-hook section 48 into the confines of the upper connector section 32 of the respective tail tube member 24. The tail hook member 20 would then be moved in a manner as noted by arrow 56 in FIG. 7 to pull the entire one-third portion of the horse's tail 16 through the tail tube member 24.

The handler would next move the upper connector section 32 axially on the one-third portion of the horse's tail 16 to a desired upper location as noted in FIG. 7. Then, the handler would use the connector member 28 and, more particularly, the drawstring 42 for securing about the desired upper location on the horse's tail 16.

The handler would then move the cloth body section 30 and lower connector section 34 of the respective tail tube member 24 to the extended condition as noted in FIG. 7. The lower connector section 34 extends below a lower portion of the horse's tail 16 to enclose same.

It is noted that the aforementioned steps for attachment of a tail tube member 24 to a one-third portion of the horse's tail 16 can be repeated until all of the tail tube members 24 are attached thereto to achieve the condition as noted in FIG. 9.

On achieving the condition as shown in FIG. 9, the next step is to braid all the three sections of the horse's tail 16 in a known manner by alternate weaving thereof to achieve a "ponytail" braided condition as noted in FIGS. 1 and 10. This braiding step is well known by a handler skilled in the maintenance of a horse member 14.

On achieving the braided condition, the lower ends of the adjacent tail tube members 24 are folded upwardly about an adjacent braided portion 68 of the horse's tail 16 and secured together by attachment of one or more of the elastic band members 22 as noted in FIG. 10. It is advisable to utilize two of the elastic band members 22 in case one of the elastic band members 22 would fail as the horse's tail 16 is used by the horse member 14 for fly swatting purposes.

It is noted that in the assembled condition of the tail lengthener assembly 12 as noted in FIG. 1, the horse's tail 16 is provided in a braided compact condition whereupon it can be utilized by the horse member 14 for fly swatting while being wrapped which is not possible with the use of a single bag type structure known in the prior art.

It is noted that the assembled tail lengthener assembly 12 as noted in FIG. 1, can be removed from the horse's tail 16 by the handler in an easy manner by just reversing the method steps as previously described for attaching the tail lengthener assembly 12 thereto.

The method of use has been described as using three (3) of the tail tube members 24 but more or less could be used depending on the number of equal sections into which the handler chooses to divide the horse's tail 16 such as two, four, or six.

It is to be noted that the tail lengthener assembly 12 of this invention, when assembled on the horse's tail 16, provides additional weight which encourages faster growth of the horse's tail 16.

Additionally, with the horse's tail 16 mounted within the tail lengthener assembly 12, this acts to hold in tail conditioners, moisturizers, and any medicinal compound that may be applied thereto.

Furthermore, the tail lengthener assembly 12 encloses the horse's tail 16 and, therefore, eliminates the need for daily tail grooming but results in a longer and more attractive appearing horse's tail 16 which give the handler that "extra edge" while engaged in horse show ring activities.

The tail lengthener assembly of this invention can be readily attached by a handler to a horse's tail without requiring great skill or knowledge. It is noted that the tail tube members can be constructed of a durable material which may be water resistant; easily washable; and of various colors to match stable colors. The tail lengthener assembly is economical to manufacture; easy to attach to a horse's tail; constructed of various colors and materials as desired; available in various lengths for use on animals having tails of various lengths such as show horses and small ponies; and being substantially maintenance free.

While the invention has been described in conjunction with preferred specific embodiments thereof, it will be understood this description is intended to illustrate and not to limit the scope of the invention, which is defined by the following claims:

I claim:

1. A tail lengthener assembly adapted to be connected to an animal's tail, comprising:

a) a tail enclosure assembly having a plurality of tail tube members, each operable to receive a portion of the animal's tail therein;

b) each tail tube member having a main tube body to receive and enclose a portion of the animal's tail and a connector member at an upper end of said main tube body for attachment to an upper portion of the animal's tail;

c) a tail hook member operable to be extended through respective ones of said tail tube members to grasp a portion of the animal's tail and pull same through the length of respective ones of said tail tube member; and d) a bias means to be mounted about a lower portion of the animal's tail and adjacent ones of said tail tube members.

2. A tail lengthener assembly as described in claim 1, wherein:

a) said tail tube member having an elongated main tube body with a body section having an integral upper connector section with said connector member mounted therein; and b) said connector member operable to releasably interconnect said upper connector section about an adjacent portion of the animal's tail.

3. A tail lengthener assembly as described in claim 2, wherein:

a) said connector member having a drawstring mounted through said upper connector section of said main tube body and having outer end portions which can be readily interconnected to each other for connecting purposes.

4. A tail lengthener assembly as described in claim 1, wherein:

a) said tail hook member having a J-hook section integral with a main body section which, in turn, has a handle section mounted thereon; and b) said J-hook section having a slot inlet portion operable to receive a portion of the animal's tail for pulling same through the length of said tail tube member.

5. A tail lengthener assembly as described in claim 1, wherein:

a) three of said tail tube members are utilized on separating said animal's tail into third portions, each of said tail tube members operable to receive an equal portion of said animal's tail; and b) said tail tube members are operable to be interwoven into a braided ponytail and interconnected at a lower end thereof by said bias member to achieve a flexible but compact structure;

whereby said tail enclosure assembly with the portions of the animal's tail therein can be utilized as an effective fly swatter by the animal having said tail lengthener assembly of this invention mounted thereon.

6. A method of use of a tail lengthener assembly utilizing a tail enclosure assembly having a plurality of tail tube members; a tail hook member; and a bias member utilized with an animal's tail, such as a horse's tail, comprising:

a) extending a tail hook member through a center of an elongated tail tube member so as to have an outer end of said tail hook member extended therefrom;

b) placing a portion of the animal's tail within a J-hook portion of said tail hook member;

c) pulling said tail hook member through a length of said tail tube member to extend the animal's tail through the length thereof;

d) moving an upper portion of said tail tube member upwardly on the animal's tail to a desired elevated position;

e) securing an upper portion of said tail tube member to and about the animal's tail;

f) pulling a remaining portion of said tail tube member downwardly on respective animal's tail so as to fully enclose same downwardly from said upper portion;

g) repeating the above steps of a)-f), inclusive, in order to apply a tail tube member to other exposed portions of said animal's tail to fully enclose same;

h) weaving adjacent ones of said tail tube members having portions of said animal's tail therein in a fashion to achieve a ponytail configuration; and i) securing adjacent outer end portions of said tail tube members having the respective portions of the animal's tail therein into a clamped manner to prevent unbraiding from said subject ponytail condition.

7. A method of use of the tail lengthener assembly as described in claim 6, wherein:

a) before inserting said tail hook member into said ones of respective tail tube members, first brushing, cleansing, and treating the animal's tail as desired and necessary.

8. A method of use of the tail lengthener assembly as described in claim 6, wherein:

a) dividing the animal's tail into three substantially equal portions, each of which is to receive one of said tail tube member thereabout.

9. A method of use of the tail lengthener assembly as described in claim 6, wherein:

a) dividing the animal's tail into substantially equal portions being four or more, each of which is to receive one of said tail tube member thereabout.

10. A method of use of the tail lengthener assembly as described in claim 6, wherein:

a) before placing a portion of the animal's tail within said tail hook member, preparing the animal's tail by brushing, cleansing, and treating as desired and necessary.

11. A tail lengthener assembly adapted to be connected to an animal's tail comprising:

a) a tail enclosure assembly having a plurality of tail tube members, each operable to receive a portion of the animal's tail therein;

b) each tail tube member having a main tube body to receive and enclose a portion of the animal's tail and a connector member at an upper end of said main tube body for attachment to an upper portion of the animal's tail; and c) a bias means to be mounted about a lower portion of the animal's tail and adjacent ones of said tail tube members.

12. A tail lengthener assembly as described in claim 11, wherein:

a) said tail tube member having an elongated main tube body with a body section having an integral upper connector section with said connector member mounted therein; and b) said connector member operable to releasably interconnect said upper connector section about an adjacent portion of the animal's tail.

13. A tail lengthener assembly as described in claim 12, wherein:

a) said connector member having a drawstring mounted through said upper connector section of said main tube body and having outer end portions which can be readily interconnected to each other for connecting purposes.

14. A tail lengthener assembly as described in claim 11, wherein:

a) a tail hook member having a J-hook section integral with a main body section which, in turn, has a handle section mounted thereon; and b) said J-hook section having a slot inlet portion operable to receive a portion of the animal's tail for pulling same through the length of said tail tube member.

15. A tail lengthener assembly as described in claim 11, wherein:

a) three of said tail tube members are utilized on separating said animal's tail into third portions, each of said tail tube members operable to receive an equal portion of said animal's tail; and b) said tail tube members are operable to be interwoven into a braided ponytail and interconnected at a lower end thereof by said bias member to achieve a flexible but compact structure;

whereby said tail enclosure assembly with the portions of the animal's tail therein can be utilized as an effective fly swatter by the animal having said tail lengthener assembly of this invention mounted thereon.

16. A method of use of a tail lengthener assembly utilizing a tail enclosure assembly having a plurality of tail tube members and a bias member utilized with an animal's tail, such as a horse's tail, comprising:

a) grasping a portion of the animal's tail and positioning adjacent to an open end of an an elongated tail tube member;

b) pulling a length of the animal's tail through a length of said elongated tail tube member;

c) moving an upper portion of said tail tube member upwardly of the animal's tail to a desired elevated position;

d) securing an upward portion of said tail tube member to and about the animal's tail;

e) pulling a remaining portion of said tail tube member downwardly on respective animal's tail so as to fully enclose same downwardly from said upper portion;

f) repeating the above steps of a)-f), inclusive in order to apply a tail tube member to other exposed portions of the animal's tail to fully enclose same;

g) weaving adjacent ones of tail tube members having portions of said animal's tail therein in a fashion to achieve a ponytail configuration; and h) securing adjacent outer end portions of said tail tube members having a respective portion of the animal's tail therein to a clamped manner to prevent unbraiding from said subject ponytail condition.

17. A method of use of the tail lengthener assembly as described in claim 16, including:

a) first extending a tail hook member through a center of said elongated tail tube member so as to have an outer end of said tail hook member extended therefrom;

b) grasping a portion of the animal's tail within a portion of said tail hook member; and c) pulling said tail hook member through a length of said tail tube member to extend the animal's tail through the length thereof.

18. A method of use of the tail lengthener assembly as described in claim 17, wherein:
   a) before inserting said tail hook member into said ones of respective tail tube members, first brushing, cleansing, and treating the animal's tail as desired and necessary.

19. A method of use of the tail lengthener assembly as described in claim 16, wherein:
   a) dividing the animal's tail into substantially equal portions being four or more, each of which to receive one of said tail tube members thereabout.

* * * * *